US008995683B2

(12) United States Patent
Schuster et al.

(10) Patent No.: US 8,995,683 B2
(45) Date of Patent: Mar. 31, 2015

(54) METHODS AND DEVICES FOR ADAPTIVE RINGTONE GENERATION

(75) Inventors: Adrian M. Schuster, Chicago, IL (US); Christopher A. Evans, Chicago, IL (US); Ukrit Visitkitjakarn, Lakemoor, IL (US); Joel Anthony Clark, Woodridge, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1529 days.

(21) Appl. No.: 11/617,803

(22) Filed: Dec. 29, 2006

(65) Prior Publication Data
US 2008/0161063 A1    Jul. 3, 2008

(51) Int. Cl.
H03G 5/00      (2006.01)
H04M 19/04     (2006.01)

(52) U.S. Cl.
CPC .................................. H04M 19/044 (2013.01)
USPC .......... 381/101; 381/103; 381/102; 381/73.1; 381/71.6; 379/375.01; 379/413

(58) Field of Classification Search
USPC ............. 381/57, 59, 315, 316, 317, 318, 320, 381/321, 71.6, 71.7, 71.9, 71.14, 73.1, 74, 381/332, 91, 92, 94.2, 94.3, 94.5, 98, 99, 381/100, 101, 102, 103, 104, 106, 107, 109, 381/110, 120, 150, 108; 455/350, 569, 567, 455/267; 379/58, 57, 388, 418, 373, 179, 379/390, 420, 375.01, 413
See application file for complete search history.

(56) References Cited

U.S. PATENT DOCUMENTS

| 4,829,565 | A | | 5/1989 | Goldberg |
| 5,844,983 | A | * | 12/1998 | Lilja ............................ 379/418 |
| 5,966,438 | A | | 10/1999 | Romesburg |
| 6,084,959 | A | | 7/2000 | Yun |

(Continued)

FOREIGN PATENT DOCUMENTS

| EP | 1 130 532 A2 | 9/2001 |
| WO | 2004093488 A2 | 10/2004 |
| WO | 2006057770 A2 | 6/2006 |

OTHER PUBLICATIONS

Maxim IntegratedTM, "Fixed-Gain Op Amps Simplify Filter Design", magazine from Maxim IntegratedTM, Application Note 700, p. 1-5, Jan. 22, 2001.*

(Continued)

*Primary Examiner* — Leshui Zhang
(74) *Attorney, Agent, or Firm* — Shumaker & Sieffert, P.A.

(57) ABSTRACT

Disclosed are methods and devices for adapting a ringtone in accordance with ambient noise. In one embodiment a method includes processing an ambient noise signal to determine an ambient noise volume. When there is an incoming communication and it is determined that the ambient noise has a low ambient noise volume, a method can include generating a ringtone having a ringtone volume that is initially a low volume and increasing the ringtone volume over a predetermined period of time. A method can include applying a filter to the ringtone signal to increase a signal-to-noise ratio, the filter configured to increase an amplitude of a frequency that is not one of the predominant frequencies of the ambient noise and that the transducer is configured to output according to the transducer frequency response. In another embodiment, a second transducer may generate a ringtone output in addition to the first transducer.

9 Claims, 6 Drawing Sheets

(56) References Cited

U.S. PATENT DOCUMENTS

| | | | |
|---|---|---|---|
| 6,134,455 A * | 10/2000 | Corkum | 455/567 |
| 6,246,761 B1 * | 6/2001 | Cuddy | 379/418 |
| 6,285,767 B1 * | 9/2001 | Klayman | 381/17 |
| 6,298,247 B1 | 10/2001 | Alperovich et al. | |
| 6,522,753 B1 | 2/2003 | Matsuzawa et al. | |
| 6,868,162 B1 | 3/2005 | Jubien et al. | |
| 7,120,579 B1 | 10/2006 | Licht | |
| 2002/0076033 A1 | 6/2002 | Baweja et al. | |
| 2003/0002659 A1 | 1/2003 | Erell | |
| 2003/0013495 A1 | 1/2003 | Oleksy | |
| 2003/0179887 A1 | 9/2003 | Cronin | |
| 2004/0078104 A1 | 4/2004 | Nguyen et al. | |
| 2006/0153358 A1 | 7/2006 | Zernovizky et al. | |
| 2011/0038490 A1 * | 2/2011 | Yang et al. | 381/103 |

OTHER PUBLICATIONS

European Patent Office, "Communication" Oct. 5, 2010, pp. 1-6, EPC Patent Application No. 07854105.9-1246, Netherlands.

Korean Intellectual Property Office, "Notice of Preliminary Rejection (Non-Final)", Korean Patent Application No. 10-2009-7013410, Jan. 14, 2011, 2 pages.

* cited by examiner

METHODS AND DEVICES FOR ADAPTIVE RINGTONE GENERATION

FIELD

Disclosed are devices and methods of a mobile communication device for signaling incoming communication with a ringtone, and more particularly, for adapting a ringtone in accordance with ambient noise.

BACKGROUND

Mobile communication devices, such as cellular telephones, are transported to different locations by their users. While in many locations an incoming communication alert is audible over the ambient noise, there are other locations where an incoming communication alert is not audible over the ambient noise. For example, in an office building an incoming communication alert is most likely audible. In certain situations where the ambient noise volume is very low, a ringtone having a normal volume may disturb people nearby. On the other hand, on a street having substantial automobile traffic, an incoming communication alert having a normal volume may not be audible over the ambient noise.

To overcome loud ambient noise for an incoming communication alert, various schemes have been used. For example, one solution includes increasing the volume of a ringtone to overcome ambient noise. However, a ringtone of an increased volume may not be actually audible over the ambient noise. Moreover, the simple solution of boosting the volume of the ringtone can overdrive the speaker, causing distortion and possibly component failures.

DETAILED DESCRIPTION

Figure 1:
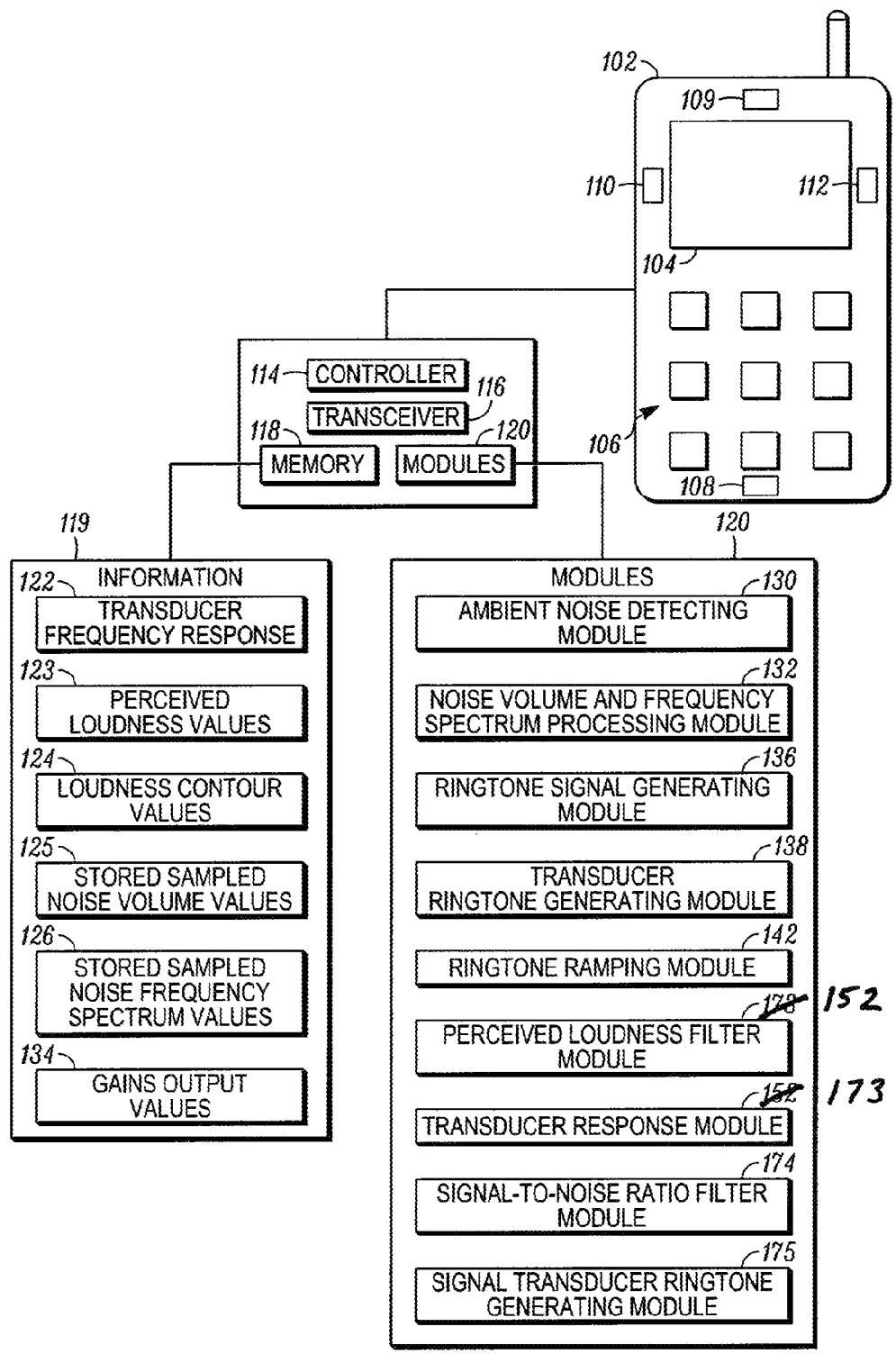
FIG. 1 depicts a mobile communication device.

It may be beneficial to generate a ringtone taking into account ambient noise characteristics. In an environment that has a low ambient noise it may be beneficial to ramp up a ringtone so as not to disturb others nearby. In an environment where the ambient noise has a loud volume, it may be beneficial to take into account the characteristics of the ambient noise and/or the transducer to generate a ringtone output that is more likely to be heard over loud ambient noise. That is, by considering the characteristics such as frequencies of the ambient noise, and frequency response characteristics of the transducer, a ringtone output may be generated that may not be masked by the ambient noise.

Disclosed are methods and devices for adapting a ringtone in accordance with ambient noise. In one embodiment a method includes processing an ambient noise signal to determine an ambient noise volume and whether the ambient noise has a low ambient noise volume. When there is an incoming communication signal and it is determined that the ambient noise has a low ambient noise volume, a method can include generating a ringtone output having a ringtone volume that is initially a low volume and increasing the ringtone volume over a predetermined period of time.

In another embodiment, a method includes processing an ambient noise signal to determine an ambient noise volume and whether the ambient noise has a volume greater than a threshold value. For example, the ambient noise may have a loud volume. Additionally, the ambient noise may be sampled and can be spectrally analyzed to determine a noise frequency spectrum. The method can further include generating by the transducer a ringtone output responsive to the ambient noise volume and the noise frequency spectrum. The noise frequency spectrum may provide different information by which to modulate a ringtone signal applied to the transducer so that there is a better chance the ringtone output will be heard over the ambient noise, and in particular over elevated ambient noise. There may be three types of ringtone signal filtering processes responsive to elevated ambient noise, including taking into account a perceived loudness criterion, taking into account the transducer frequency response including high and low efficiency bands to maximize energy in the region of the highest transducer sensitivity, and generating a ringtone output having an increased signal-to-noise ratio. Each of the discussed types of filtering processes may be used independently of the others or in any combination with the others.

In one embodiment, the method may include generating a ringtone signal so that the frequencies of the ambient noise that have a perceived loudness higher than a particular perceived loudness may not be duplicated by the transducer. In this way, frequencies of a higher perceived loudness different from those of the ambient noise having a higher perceived loudness may be generated by the transducer.

In one embodiment, the transducer's frequency response may be characterized by one or more low efficiency bands and one or more high efficiency bands. A method can include applying a filter to the ringtone signal, the filter configured to increase an amplitude of at least one frequency in the high efficiency band of the transducer and applying a filter to the ringtone signal, the filter configured to reduce an amplitude of at least one frequency of the low efficiency band of the transducer. In this way, the energy sent to drive the transducer in accordance with a filtered ringtone signal may be spent on driving it more efficiently, thus maintaining control of the total ringtone output signal frequency to avoid overdriving the transducer.

In another embodiment, the transducer's frequency response may be characterized by the particular frequencies that can be output efficiently by the transducer. A method can include applying a filter to the ringtone signal to increase a signal-to-noise ratio, the filter configured to increase an amplitude of a frequency that is not one of the predominant frequencies of the ambient noise and that the transducer is configured to output according to the transducer frequency response. A method can also include applying a filter to the ringtone signal to increase the signal-to-noise ratio, the filter configured to reduce an amplitude of at least one of the predominant frequencies of the ambient noise that the transducer is configured to output according to the transducer frequency response.

In another embodiment, a second transducer may generate a ringtone output in addition to the ringtone output generated by the first transducer. Accordingly, a ringtone generated by a combination of activation of the first transducer and the second transducer may be more audible than a ringtone generated by a single transducer. A method may include activating the first transducer to generate ringtone output responsive to the ambient noise volume and the noise frequency spectrum and activating an additional or a second transducer to generate ringtone output responsive to the ambient noise volume and the noise frequency spectrum. In another embodiment, a second or additional transducer may have a narrower bandwidth than the first transducer and may provide a high sound pressure over its limited frequency response. In lower ambient noise environments, an additional transducer may not be used so as to maintain audio quality of the ringtone. In a high noise environment, audio quality may be less important than an audible ringtone.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a mobile communication device 102. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The mobile communication device 102 may include a display 104, an input device 106, a microphone 108, and at least one transducer 109. A ringtone transducer 110 may be different than that of the earpiece transducer 109. An additional ringtone transducer 112 is also depicted. The mobile communication device may further include a controller 114, a transceiver 116, a memory 118 and modules 120. A memory 118 of the device 102 may be used to store information 119 such as data, look-up tables, and detected and calculated values. The memory 110 may also be used to store modules 120 that are configured to carry out certain processes of the methods as described herein. Steps of methods may involve modules and modules 120 may be inferred by the methods discussed herein. The modules 120 can be implemented in software, such as in the form of one or more sets of prestored instructions, and/or hardware, which can facilitate the operation of the mobile station or electronic device as discussed below. The modules 120 may be installed at the factory or can be installed after distribution by, for example, a downloading operation. The operations in accordance with the modules will be discussed in more detail below.

The stored information 119 can include, for example, transducer frequency response data 122 and perceived loudness values 123 that may be in the form of loudness contour values 124 or may be stored in the form of one or more predefined equations. It is understood that any manner in which to store or receive stored information 119 is within the scope of this discussion. The transducer frequency response data 122 may be extrapolated from information, for example, provided by the manufacturer of the transducer and/or an acoustic designer. It is understood that an actual frequency response need not be stored, but that a representation describing the transducer frequency response may be stored or received in any manner. For example, a single value indicating a transducer cutoff frequency may be a representation of the frequency response. It is understood that the same notion may apply to one or more perceived loudness values as well. Perceived loudness values can be determined through testing hearing responses of people. The human ear may hear or respond to certain frequencies better than others. Research relating to the frequencies of sounds, in particular those that may be generated by the transducer 110 may be available from different sources and may be extrapolated in any suitable manner and stored in any form in memory 118. Other values of the stored information may be generated during various calculations that are discussed in detail below. For example, values based on sampled ambient noise volume values 126, sampled noise frequency spectrum values 128 and resultant gain output values 134 can be stored as well.

Still referring to the stored information 119, the described device 102 may store and process, or process in real time, the sampled volume values 126 and the sampled frequency spectrum values 128 determined by the ambient noise detecting module 130. The sampled values 126 and 128 may be processed by noise volume and noise frequency spectrum processing module 132 from values received from the ambient noise detecting module 130. A noise volume and noise frequency spectrum processing module 132 can be configured to determine whether the ambient noise has a low, normal or high ambient noise volume and the characteristics of its noise frequency spectrum.

If the ambient noise is low, a ringtone ramping process discussed in detail below may be used. Referring to a ringtone ramping module 142, in a low volume embodiment a method can include processing an ambient noise signal to determine an ambient noise volume and whether the ambient noise has a low ambient noise volume. When there is an incoming communication signal and it is determined that the ambient noise has a low ambient noise volume, a method can include generating a ringtone having a ringtone volume that is initially a low volume and increasing the ringtone volume over a predetermined period of time according to the ringtone ramping module 130.

As will be described in more detail below with reference to the method diagram of FIG. 5, when the ambient noise is detected as having a low volume, in one embodiment, a ringtone ramping module 142 can be configured to generate by the transducer a ringtone output having a ringtone volume that is initially a low volume and increasing the ringtone volume over a predetermined period of time. In this way, in a quiet environment, others close to the device as it begins to ring may not be disturbed by the ringtone. A user may be able to answer the incoming communication before the ringtone becomes loud enough to disturb others in the quiet environment.

As will be described in more detail below with reference to the method diagram of FIG. 6, in another embodiment, a method includes processing an ambient noise signal to determine an ambient noise volume and whether the ambient noise has a volume greater than a threshold value. For example, the ambient noise may have a loud volume. As will be discussed in detail below, different filters may be applied to the ringtone signal to overcome various aspects of elevated ambient noise. For example, the ambient noise may be sampled to determine a noise frequency spectrum to determine the various aspects of elevated ambient noise.

Still referring to FIG. 1, a noise volume and noise frequency spectrum processing module 132 can determine the detected frequencies of the ambient noise and their respective amplitudes. As mentioned above, in the case of elevated ambient noise, there may be three types of filtering processes, including taking into account a perceived loudness criterion, taking into account the transducer frequency response including high and low efficiency bands, and generating a ringtone signal configured to have an increased signal-to-noise ratio that can be based on the detected volume and the noise frequency spectrum. Each of the discussed types of filtering processes may be used independently of the others or in any combination with the others. Moreover, additional filtering may be used in conjunction with any one of the described processes and/or a combination of any of the described processes. A ringtone signal generating module 136 can be responsive to an incoming communication signal. A transducer ringtone generating module 138 can receive a filtered ringtone signal as described in detail below and can be configured to generate a ringtone.

Still referring to FIG. 1, in one embodiment, the method may include generating a ringtone so that the frequencies of the ambient noise that have a perceived loudness greater than a particular perceived loudness may not be duplicated by the transducer. In this way, frequencies different from those of the ambient noise having a perceived loudness greater than a particular perceived loudness may be generated by the transducer. Moreover, the characteristics of the transducer, for example, a transducer frequency response, may be considered in generating the ringtone signal. Accordingly, the modules can include a perceived loudness filter module 152 configured to apply a filter to the ringtone signal to increase a perceived loudness of the ringtone over a perceived loudness of the ambient noise.

Still referring to FIG. 1, the modules 120 can include a transducer response module 173 that can be configured to generate a ringtone output by the transducer responsive to the ambient noise volume and the noise frequency spectrum. The noise frequency spectrum may provide different information by which to modulate the ringtone signal so that there may be a better chance the ringtone output will be heard over the ambient noise, and in particular elevated ambient noise.

Figure 4:
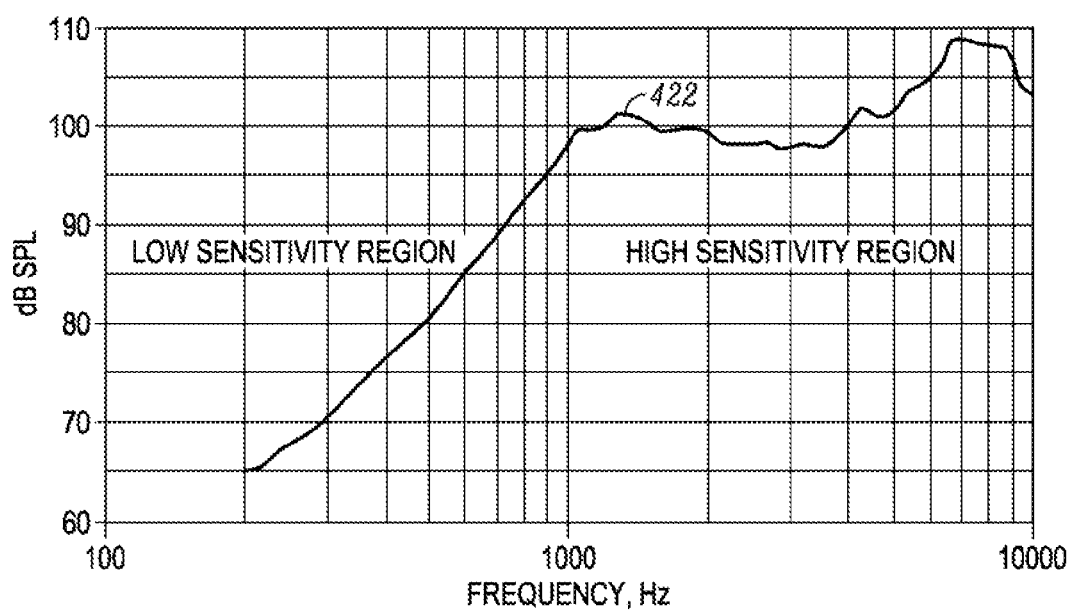
FIG. 4 is a graph illustrating a loudspeaker frequency response.

As mentioned above, the transducer's frequency response may be characterized by a low efficiency band and a high efficiency band (see FIG. 4). When the transducer is driven by signals with frequencies in a low efficiency band, even at high volumes, the transducer may produce ineffective output. However, when driven by signals with frequencies in a high efficiency band at high volumes, the transducer may produce more effective output. In another embodiment, a filter can be applied to the ringtone signal, the filter configured to increase the amplitude of at least one frequency in the high efficiency band of the transducer and applying a filter to the ringtone signal, the filter configured to reduce an amplitude of at least one frequency of the low efficiency band of the transducer. Accordingly, the modules can include a transducer response filter module 173 configured to apply a filter to the ringtone signal, the filter configured to increase an amplitude of at least one frequency in the high efficiency band of the transducer as well as apply a filter to the ringtone signal, the filter configured to reduce an amplitude of at least one frequency of the low efficiency band of the transducer.

In yet another embodiment, a method can include applying a filter to the ringtone signal to increase a signal-to-noise ratio, the filter configured to increase the amplitude of a frequency that is not one of the predominant frequencies of the ambient noise and that the transducer is configured to output according to the transducer frequency response. A method can also include applying a filter to the ringtone signal to increase the signal-to-noise ratio (SNR), the filter configured to reduce the amplitude of at least one of the predominant frequencies of the ambient noise that the transducer is configured to output according to the transducer frequency response. Accordingly, the modules can include an SNR filter module 174 configured to apply a filter to the ringtone signal to increase a signal-to-noise ratio, the filter configured to increase an amplitude of a frequency that is not one of the predominant frequencies of the ambient noise and that the transducer is configured to output according to the transducer frequency response as well as apply a filter to the ringtone signal to increase the signal-to-noise ratio, the filter configured to reduce an amplitude of at least one of the predominant frequencies of the ambient noise that the transducer is configured to output according to the transducer frequency response. It may be preferable to process the SNR so that a value is optimized.

In still another embodiment, a second transducer 112 may generate a ringtone output in addition to that of the first transducer 110. A method may include activating the first transducer 110 to generate ringtone output responsive to the ambient noise volume and the noise frequency spectrum and activating the second transducer 112 to generate ringtone output that may be responsive to the ambient noise volume and the noise frequency spectrum. Accordingly, the modules 120 can include a second transducer ringtone generating module 175 configured to activate a second transducer 112 to generate ringtone output responsive to the ambient noise volume and the noise frequency spectrum.

Figure 2:
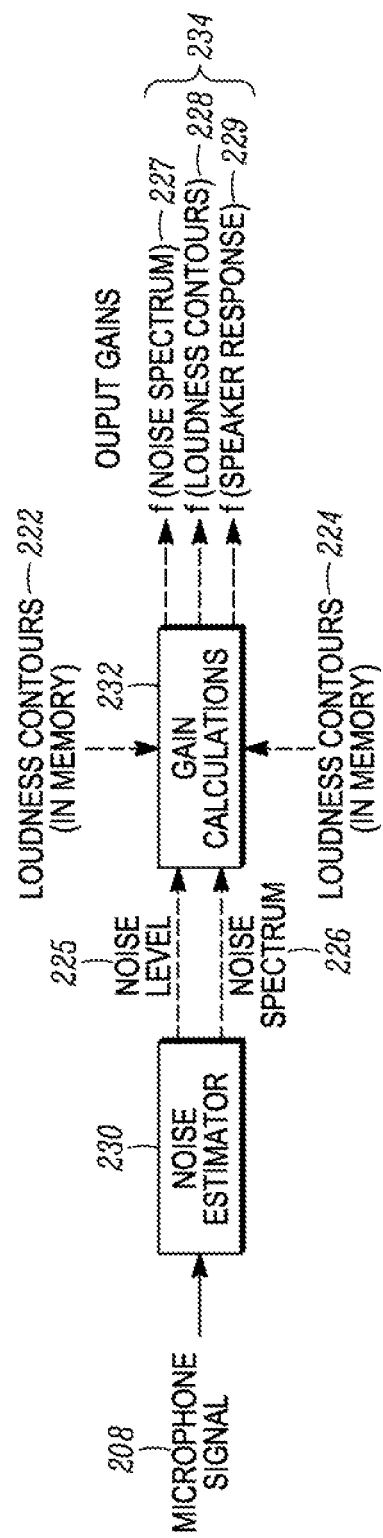
FIG. 2 is a system diagram illustrating embodiment of an input signal and gain outputs.

FIG. 2 is a system diagram illustrating an input signal 208 and gains output 234. The ambient noise can be sampled by the microphone 108 of the device or any other suitable ambient noise monitoring device. A microphone signal 208 may be processed by a noise estimator 230 such as the above-mentioned ambient noise detecting module 130 so that the volume or noise level 226 of the ambient noise is determined as well as the noise frequency spectrum 228. Gain calculations 232 may be made based on loudspeaker or transducer frequency response values 222, and loudness contour values 224. Gain calculations 232 can be made in accordance with the noise volume and frequency spectrum processing module 132 and/or transducer response module 173 that can be configured to determine whether the ambient noise has a low, normal or high ambient noise volume and determine its noise frequency spectrum.

Gains output 234 that can be functions of the noise frequency spectrum including volume 227, loudness contours 227 and/or the transducer frequency response 228 may be generated and may be stored as gain output values 134 (see FIG. 1) in memory 118 for processing. The gains output 234 may be used in filtering a ringtone signal so that the frequencies of a ringtone output may not be masked by the frequencies of the ambient noise. In this manner, a user may have a better opportunity to hear a ringtone even in the presence of elevated ambient noise.

Figure 3:
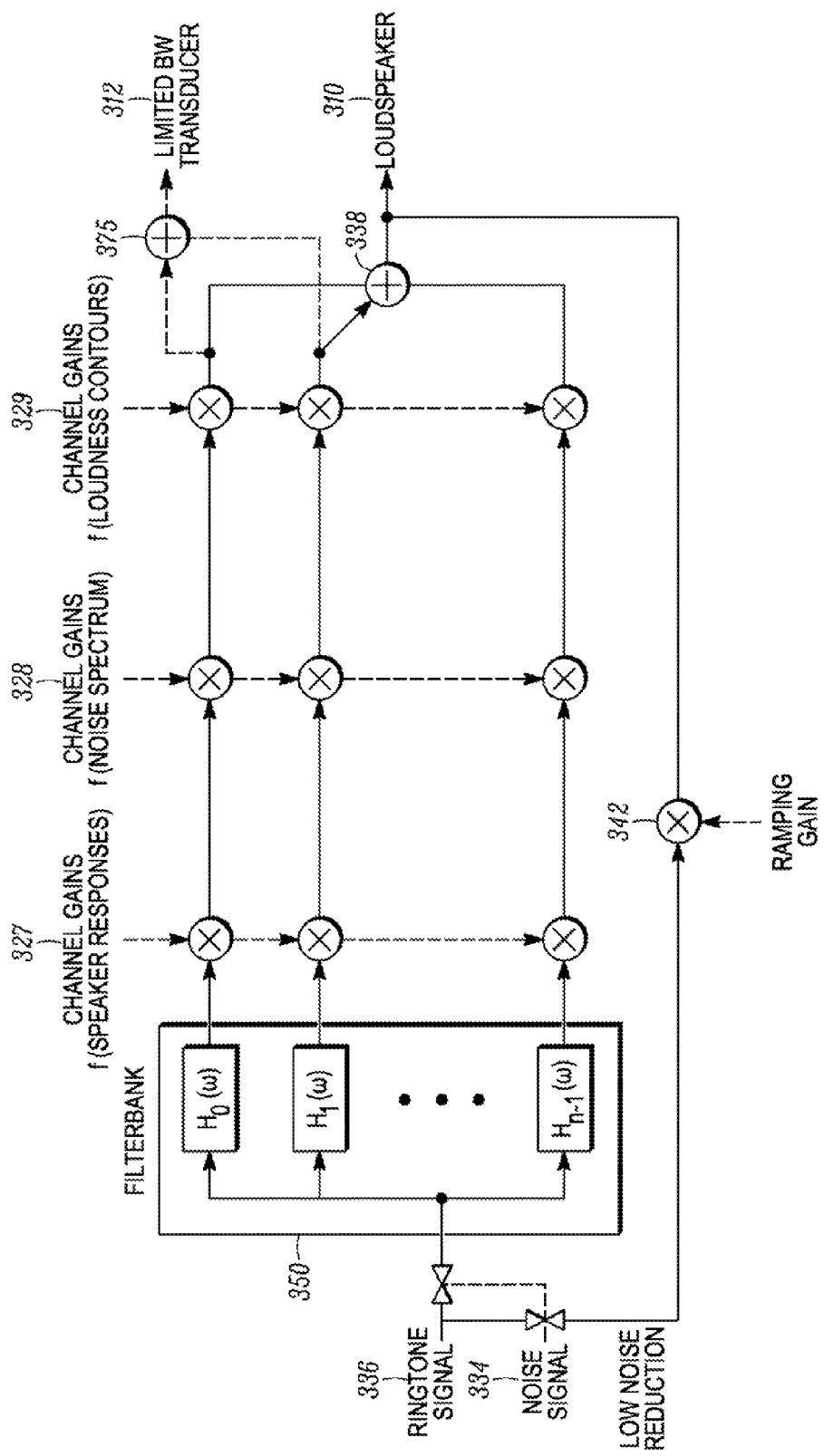
FIG. 3 is a diagram illustrating an embodiment of a filtering system for a ringtone input signal.

FIG. 3 is a diagram illustrating an embodiment of a filtering system for a ringtone input signal. The ringtone input signal 336 may be generated when the device receives an incoming communication signal in accordance with a ringtone signal generating module 136 (see FIG. 1). A ringtone signal 338 can be delivered to the transducer 310 (see 110, FIG. 1) so that the transducer can generate ringtone output in accordance with transducer ringtone generating module 138. An incoming communication signal can be any type of communication signal, including for example, an incoming telephone call, SMS message, a voice mail alert or any type internally generated audible alert.

The output gains 234 (see FIG. 2) can provide parameters used in filtering such as the transducer frequency response 327, the detected noise spectrum 328, and the loudness contours 329. A filter bank 350 can include a plurality of filters configured to accomplish filtering functions. For example, in one implementation filter bank 350 can resolve ringtone signal 336 into separate channel signals, the resolving defined by n functions $H_0(\omega), \ldots, H_{n-1}(\omega)$. Channel gains based on transducer frequency response 327, detected noise spectrum 328, and/or loudness contour criteria 329 may be applied to the separated channel signals. The separated channel signals can be recombined 338 for delivery to the loudspeaker or transducer 310. In addition, some channel signals can be combined 375 for delivery to a limited bandwidth second transducer 312. It is understood that the filter bank 350 can include one or more filters and is not limited to any one implementation. For example, filter bank 50 may include digital and/or analog filters and may be time domain based or frequency domain based.

The second transducer 112 (see FIG. 1) may be activated in addition to activation of the first transducer. Moreover, the second transducer may have a frequency response different from a frequency response of the first transducer. Furthermore, the second transducer may have a narrow frequency response. In lower ambient noise environments, an additional transducer may not be used so as to maintain audio quality of the ringtone. In a high noise environment, audio quality may be less important than an audible ringtone.

As discussed above, in one embodiment, it may be determined that the ambient noise has a low volume. Accordingly, an amplifier or gain modifier 342 in accordance with the ringtone ramping module 142 (see FIG. 1) may begin the ringtone low and increase the ringtone volume over a predetermined period of time when it is determined that the ambient noise has a low ambient noise volume. In one embodiment, the ringtone may reach a predetermined loudness within a predetermined period of time, that may be for example five seconds. In another embodiment, the ringtone may reach a predetermined loudness after a predetermined number of rings, for example, three rings.

The ringtone signal 336 can be processed by the bank of filters 350 so that the ringtone output generated by the transducer can be responsive to the ambient noise volume 324, the noise frequency spectrum 328 and/or the speaker frequency response 322 depending upon the method invoked for adapting the ringtone. As mentioned above, there may be approximately three types of filtering processes for loud ambient noise, including taking into account a perceived loudness criterion, taking into account the transducer frequency response including high and low efficiency bands, and generating a ringtone output having an increased signal-to-noise ratio. The filtering may occur in any suitable order. Each of the discussed types of filtering processes may be used independently of the others or in any combination with the others.

The ringtone signal 338 delivered to the transducer may be supplemented by an additional output 375 of a second transducer 312 that may generate a ringtone output in addition to that of the first transducer 310 in accordance with second transducer ringtone generating module 175. Accordingly, a method may include activating the transducer 310 to generate ringtone output responsive to the ambient noise volume and the noise frequency spectrum and activating another or second transducer 312, possibly of a limited bandwidth, to generate ringtone output responsive to the ambient noise volume and the noise frequency spectrum.

FIG. 4 is a graph illustrating a loudspeaker frequency response 422. As mentioned above, the loudspeaker frequency response values may be used as parameters to configure one or more filters to filter the ringtone signal. In this way, generation of the ringtone may be more efficient, using frequencies that the loudspeaker 110 (see FIG. 1) is best at generating. The graph of FIG. 4 illustrates a loudspeaker frequency response curve 422 where the horizontal axis is logarithmic in frequency in Hertz (Hz), and where the vertical axis is linear in decibels (dB). In the example loudspeaker frequency response, the speaker is more responsive to frequencies above 1000 Hz, so that signals with frequencies above 1000 Hz drive the speaker more efficiently. Therefore, in this high sensitivity region it may be beneficial to boost the gain of the ringtone signal. In the low sensitivity region below 1000 Hz, it may be beneficial to suppress the gain of a ringtone signal in this region.

Figure 5:
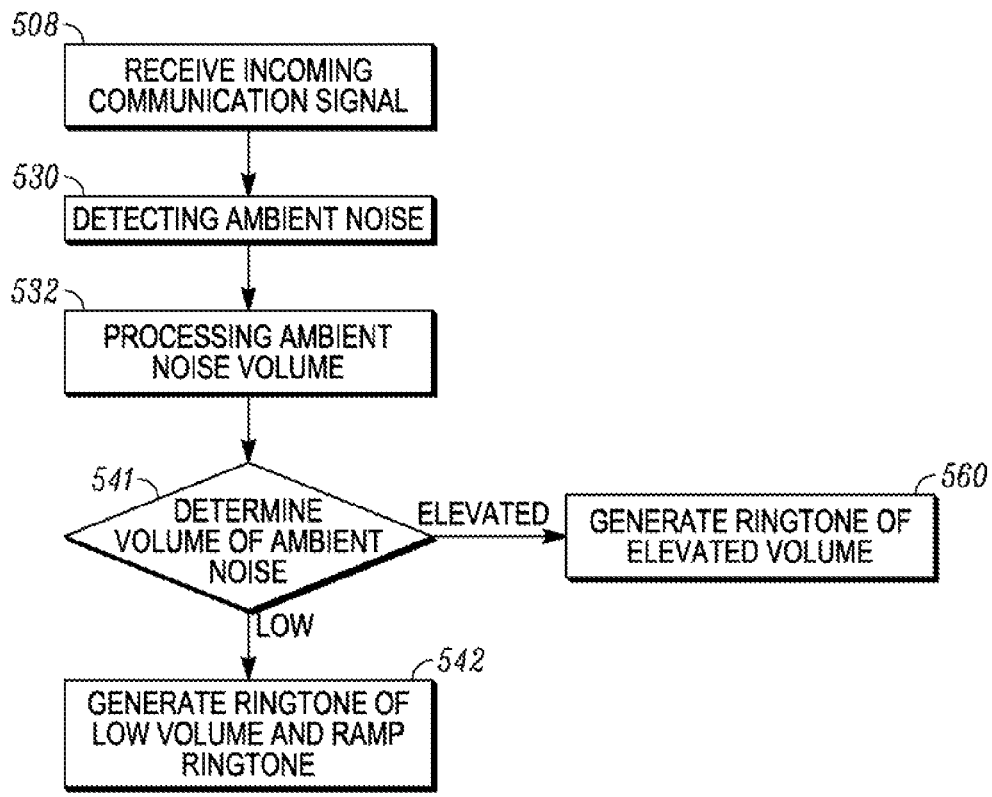
FIG. 5 is a flow chart depicting an embodiment of a low volume ringtone adaptive process.

FIG. 5 is a flow chart depicting an embodiment of the above-described low volume ringtone adaptive process. As mentioned a transceiver 116 (see FIG. 1) or an alert generator may receive an incoming communication signal 508 of any type for which a ringtone may be generated. On a periodic basis and/or in response to the received incoming communication signal, the ambient noise may be detected 530 in accordance with the ambient noise detecting module 130. The ambient noise volume can be processed 532 in accordance with the ambient noise processing module 132. The volume of the ambient noise can be determined 541. If it is determined that the ambient noise volume is elevated above a low volume, the ringtone may be generated according to an elevated ambient volume 560. If it is determined that the ambient noise volume is low, such as less than 45 dB spl then a ringtone of a low volume can be generated 542 and can be increased over a predetermined period of time in accordance with ringtone ramping module 142.

Figure 6:
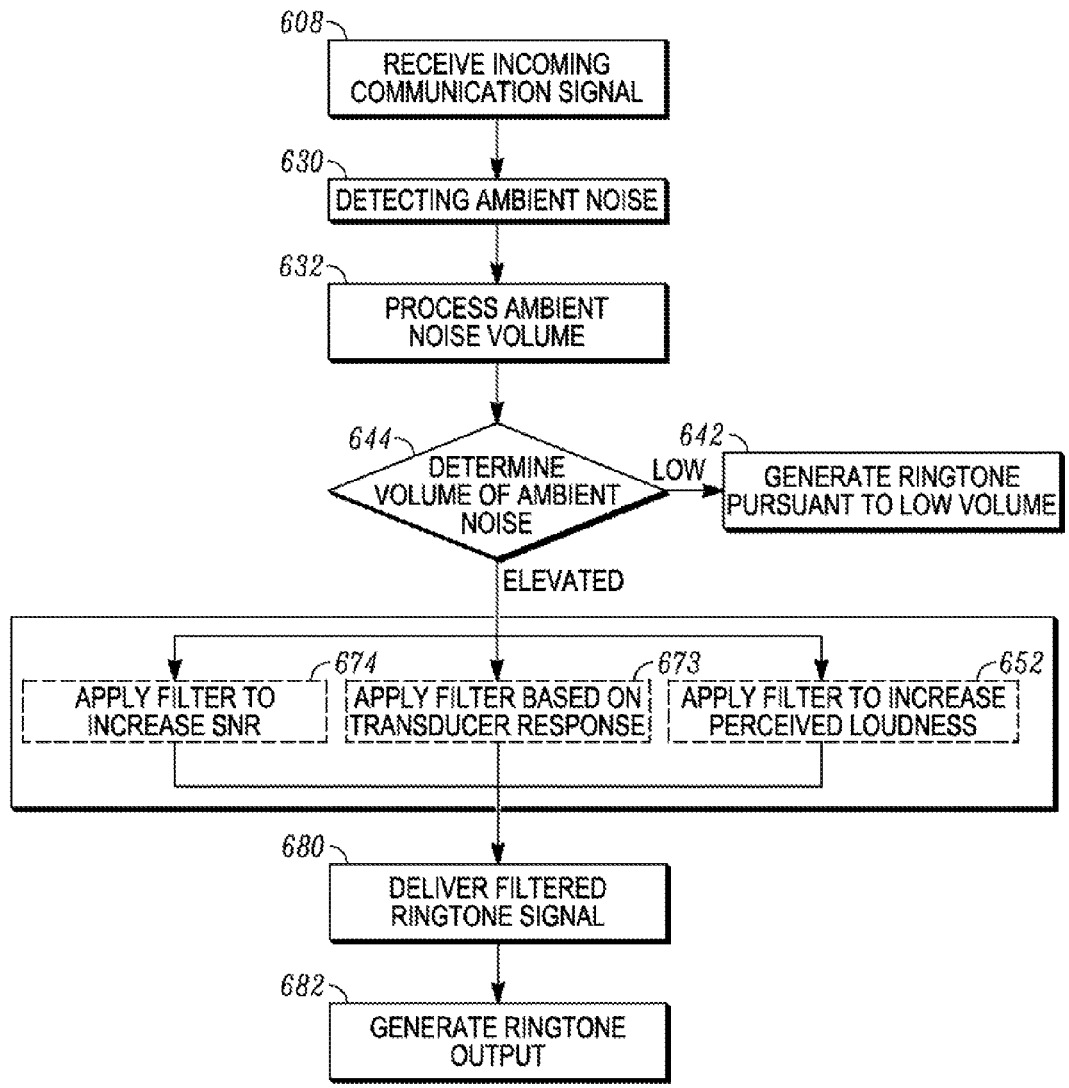
FIG. 6 is a flow chart depicting an embodiment of an elevated volume ringtone adaptive process.

FIG. 6 is a flow chart depicting an embodiment of the above-described elevated volume ringtone adaptive process. As mentioned, a transceiver 116 (see FIG. 1) or an alert generator may receive an incoming communication signal 608 of any type for which a ringtone may be generated. On a periodic basis and/or in response to the received incoming communication signal, the ambient noise may be detected 630 in accordance with the ambient noise detecting module 130. The ambient noise volume can be processed 632 in accordance with the ambient noise processing module 132. The volume of the ambient noise can be determined 641. If it is determined that the ambient noise volume is a low volume, the ringtone may be generated according to a low ambient noise volume 642 such as the above described ramping process. It is understood that a low ambient noise volume can be processed 642 in any suitable manner. If it is determined that the ambient noise volume is elevated, such as greater than 65 dB spl, then a ringtone of a elevate volume can be generated in accordance with one or more of the described filtering processes.

The three above mentioned filtering steps 652, 673, and 674 are indicated by dashed boxes to indicate that one or more filters are optionally applied. In one embodiment, a method can include the step of applying transducer frequency response filter to the ringtone signal 673, the filter configured to increase an amplitude of at least one frequency in the high efficiency band of the transducer and applying a filter to the ringtone signal, the filter configured to reduce an amplitude of at least one frequency of the low efficiency band of the transducer that may be based on stored transducer frequency response information 122 (see FIG. 1) and in accordance with transducer response module 173. A filter can be applied to the ringtone signal in the step to increase the perceived loudness 652 in accordance with perceived loudness filter module 152.

A step of the method can include applying a filter to the ringtone signal to increase the signal-to-noise ratio (SNR) 674, the filter configured to increase an amplitude of a frequency that is not one of the predominant frequencies of the ambient noise and that the transducer is configured to output according to the transducer frequency response and applying a filter to the ringtone signal to increase the signal-to-noise ratio, the filter configured to reduce an amplitude of at least one of the predominant frequencies of the ambient noise that the transducer is configured to output according to the transducer frequency response. A filtered ringtone signal may be delivered 680 to the transducer 110 to generate a ringtone output 682.

The filtering processes 652, 673 and 674 described immediately above may part of the filter bank 350 (see FIG. 3) and combined with filtering according to the gains output 234 (see FIG. 2) illustrated as 322, 324 and 328 (see FIG. 3). It is understood that in various implementations, the described filtering processes may overlap or may be further separated into additional filtering processes. It is further understood the each of the above discussed types of filtering processes may be used independently of the others or in any combination with the others. Moreover, it is understood that additional filtering processes may be used in combination with any or all of the described filtering processes.

It may be beneficial to generate a ringtone taking into account ambient noise characteristics. In an environment that has a low ambient noise it may be beneficial to ramp up a ringtone so as not to disturb others nearby. In an environment where the ambient noise has a loud volume, it may be beneficial to take into account the noise frequency spectrum of the ambient noise to generate a ringtone that is more likely to be heard over loud ambient noise. That is, by considering the characteristics such as frequencies of the ambient noise, and the characteristics of the transducer, a ringtone may be generated that may not be masked by the ambient noise.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a mobile communication device for adapting a ringtone output in accordance with an ambient noise, a signal-to-noise ratio, and a frequency response of a transducer of the mobile communication device, the method comprising:
   detecting, by the mobile communication device, the ambient noise to generate an ambient noise signal;
   processing, by the mobile communication device, the ambient noise signal to determine an ambient noise volume;
   receiving, by the mobile communication device, an incoming communication signal;
   generating, by the mobile communication device and in response to the incoming communication signal, the ringtone output, wherein generating the ringtone output comprises:
      when the ambient noise volume is not greater than a threshold value, increasing a volume of the generated ringtone output over a predetermined period of time in accordance with a ringtone ramping process; and
      when the ambient noise volume is greater than the threshold value:
         processing, by the mobile communication device, the generated ambient noise signal to determine a noise frequency spectrum;
         processing, by the mobile communication device, the determined noise frequency spectrum to determine predominant frequencies of the ambient noise;
         generating, by the mobile communication device, a ringtone signal prior to generating the ringtone output;
         applying, by the mobile communication device, a filter to the generated ringtone signal to increase the signal-to-noise ratio for generating a filtered ringtone signal, the filter being configured to increase, relative to an amplitude of the generated ringtone signal at the predominant frequencies of the ambient noise, an amplitude of the generated ringtone signal at a frequency that is not one of the predominant frequencies of the ambient noise; and
         outputting, by the transducer, the ringtone output according to the filtered ringtone signal and the frequency response of the transducer.

2. The method of claim 1, wherein generating the ringtone output further comprises:
   applying, by the mobile computing device, a filter to the generated ringtone signal to increase a perceived loudness of the ringtone output over a perceived loudness of the ambient noise for producing a perceived loudness ringtone signal; and
   when the ambient noise volume is greater than the threshold value, activating, by the mobile computing device, the transducer to generate the ringtone output such that the ringtone output has a ringtone volume that is an elevated volume, based on the generated ringtone signal and the perceived loudness ringtone signal.

3. The method of claim 1, wherein generating the ringtone output further comprises:
   applying, by the mobile communication device, the filter to the generated ringtone signal to reduce an amplitude of at least one frequency of a low efficiency band of the transducer for producing a modified ringtone signal; and activating, by the mobile communication device, the transducer to generate the ringtone output having a ringtone volume that is an elevated volume, when it is determined that the ambient noise volume is greater than the threshold value, based on the filtered ringtone signal and the modified ringtone signal.

4. The method of claim 1, wherein generating the ringtone output further comprises:

applying the filter to the generated ringtone signal to increase the signal-to-noise ratio by reducing an amplitude of at least one of the predominant frequencies of the ambient noise; and activating the transducer to generate, based on the filtered ringtone signal, the ringtone output having a ringtone volume that is an elevated volume when it is determined that the ambient noise volume is greater than the threshold value.

5. The method of claim 1, wherein generating the ringtone output further comprises:

applying, by the mobile communication device, the filter to the generated ringtone signal to decrease an amplitude of one or more frequencies of the generated ringtone signal for producing the filtered ringtone signal, wherein the one or more frequencies are not different from frequencies of the noise frequency spectrum having a perceived loudness greater than a particular perceived loudness.

6. The method of claim 1, wherein generating the ringtone output further comprises:

generating, by the transducer, the ringtone output based on the filtered ringtone signal, the ringtone output having a ringtone volume that is an elevated volume when it is determined that the ambient noise volume is greater than the threshold value.

7. The method of claim 1, wherein generating the ringtone output comprises:

applying, by the mobile communication device, the filter to the ringtone signal, the filter configured to increase an amplitude of at least one frequency of a high efficiency band of the transducer to produce a modified ringtone signal; and activating, by the mobile communication device, the transducer to generate the ringtone output having a ringtone volume that is an elevated volume, when it is determined that the ambient noise volume is greater than the threshold value, based on the filtered ringtone signal and the modified ringtone signal.

8. The method of claim 1, wherein the filter is configured to increase an amplitude of at least one frequency that is different from frequencies of the determined noise frequency spectrum.

9. A mobile communication device comprising:

a transducer; and a memory storing modules configured to:

detect an ambient noise to generate an ambient noise signal;

process the ambient noise signal to determine an ambient noise volume;

receive an incoming communication signal;

generate, in response to the incoming communication signal, the ringtone output, wherein, when generating the ringtone output, the modules:

when the ambient noise volume is not greater than a threshold value, increase a volume of the generated ringtone output over a predetermined period of time in accordance with a ringtone ramping process; and when the ambient noise volume is greater than the threshold value:

process the generated ambient noise signal to determine a noise frequency spectrum;

process the determined noise frequency spectrum to determine predominant frequencies of the ambient noise;

generate a ringtone signal prior to generating the ringtone output;

apply a filter to the generated ringtone signal to increase a signal- to-noise ratio for generating a filtered ringtone signal, the filter being configured to increase, relative to an amplitude of the generated ringtone signal at the predominant frequencies of the ambient noise, an amplitude of the generated ringtone signal at a frequency that is not one of the predominant frequencies of the ambient noise; and output, via the transducer, the ringtone output according to the filtered ringtone signal and a frequency response of the transducer.

\* \* \* \* \*